July 22, 1969    J. SUNASKY    3,456,970
CONNECTIONS BETWEEN STRUCTURAL COMPONENTS
Filed Aug. 24, 1967    2 Sheets-Sheet 1

Inventor
Joseph Sunasky
by Sommers & Young
Attorneys

July 22, 1969  J. SUNASKY  3,456,970
CONNECTIONS BETWEEN STRUCTURAL COMPONENTS
Filed Aug. 24, 1967  2 Sheets-Sheet 2
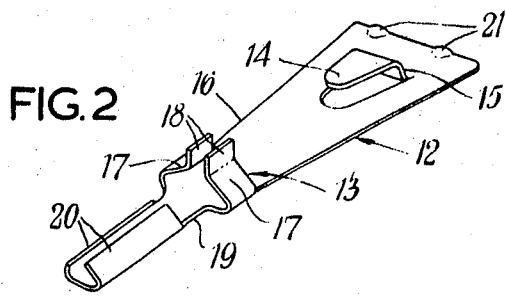
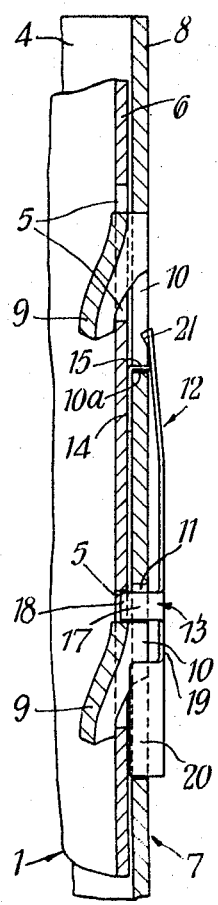
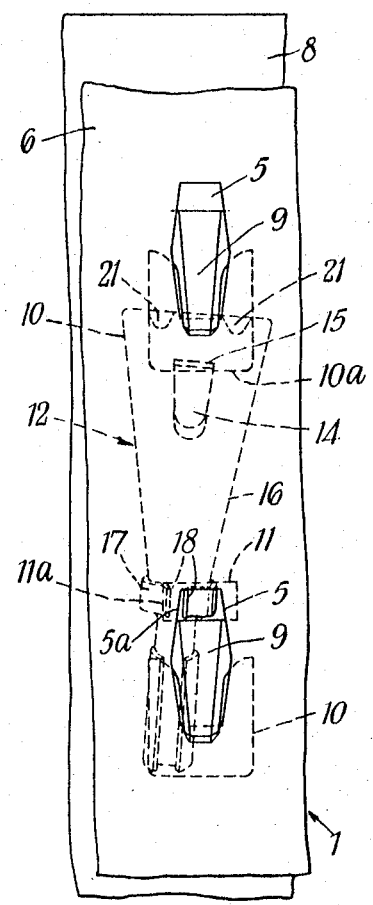
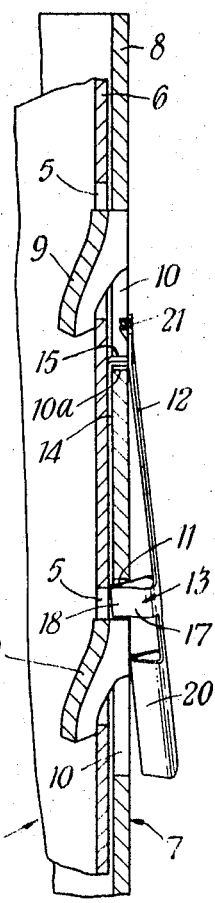
Inventor
Joseph Sunasky
by Sommers & Young
Attorneys

United States Patent Office 3,456,970
Patented July 22, 1969

3,456,970
CONNECTIONS BETWEEN STRUCTURAL COMPONENTS
Joseph Sunasky, Wembley Park, England, assignor to Dexion Limited, Wembley Park, England, a corporation of Great Britain
Filed Aug. 24, 1967, Ser. No. 662,989
Claims priority, application Great Britain, Sept. 6, 1966, 39,842/66
Int. Cl. F16b 1/00, 3/00, 5/00
U.S. Cl. 287—189.35                6 Claims

ABSTRACT OF THE DISCLOSURE

The invention is concerned with a locking device for use in conjunction with connection means comprising at least one hook member provided upon a first component and engageable in a hole in a second component of a structure such as a racking structure. The locking device is arranged to be fixed to the first component with the assistance of a hole provided in the said first component where a hook member is located and/or to pass through the said first component for the purpose of locking engagement in a hole in the second component by way of a hole provided in the first component where a hook member is located.

---

Figure 1:
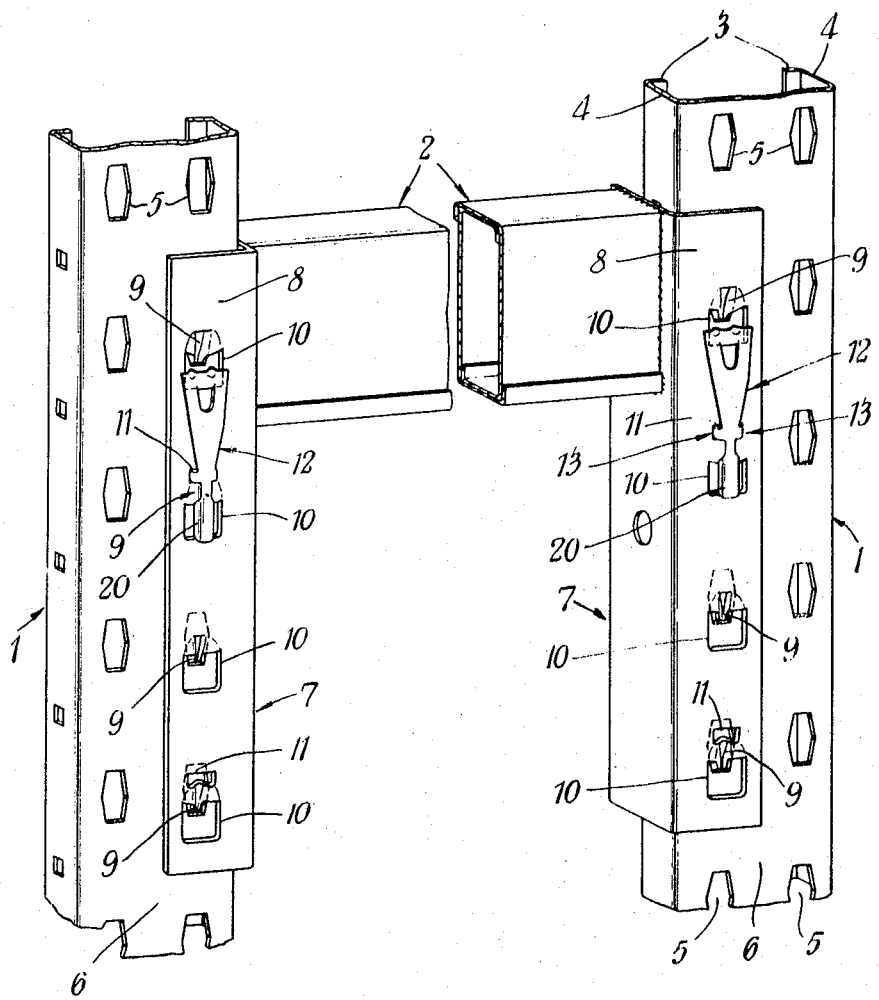

This invention concerns improvements relating to connections between structural or other components, especially between metal upright and beam components of racking and like frame structures. It seeks, in particular, to provide improved locking means for securing such connections against unintentional release. The improved locking means are particularly intended for use in racking in which the basic components, namely uprights and beams, are held together by means of hooks provided on the one component and engageable in holes provided in the other component.

According to the present invention, a locking device for use in conjunction with connection means comprising at least one hook member provided upon a first component and engageable in a hole in a second component is arranged to be fixed to the first component with the assistance of a hole provided in the said first component where a hook member is located and/or to pass through the said first component for the purpose of locking engagement in a hole in the second component by way of a hole provided in the first component where a hook member is located. Advantageously, the hole or each hole in the first component is a hole produced in the said component in the formation of a hook member or members from the material of that component.

With this arrangement, no special lock opening need be provided in the first component and hook members can be provided on the said component at any of the equally pitched positions, for instance four positions, corresponding to the positions of consecutive holes in the second component. No fixing rivet and rivet hole are essential for securing the locking device. Assembly of the locking device with the first component is simple, as is replacement of a locking device in the event of damage.

Advantageously, part of the locking device serving as a finger piece may be arranged to be received within a hole in the first component, or in a contiguous recess in the latter, so that a substantially flush surface is presented at the outer face of the said component, thus reducing the risk of damage to, or by, the locking device.

One manner in which the invention can be carried into effect will now be more fully described by way of example and with reference to the accompanying drawings, in which:

FIGURE 1 is a perspective view of part of a racking structure, showing portions of two uprights and a beam,
FIGURE 2 is a perspective underneath view of a locking device to a larger scale.
FIGURE 3 is an elevation, to an even larger scale, illustrating from the inside parts of an upright and beam with two hook members and showing in broken lines a locking device in the disengaged position, and
FIGURES 4 and 5 are a vertical section, at right angles to FIGURE 3, showing the locking device in the engaged and disengaged positions respectively.

For the example illustrated, it will be assumed that the racking structures includes two kinds of basic components, namely uprights 1 and horizontal beams 2. As may be seen in FIGURE 1, the uprights are steel sections of rectangular channel shape with inturned lips 3 at the rear edges of their flanges 4 and with two vertical lines of equally pitched holes 5 in their front face 6. The holes 5 are of the shape of a vertically elongated symmetrical diamond with truncated top and bottom ends. The beams 2, which brace pairs of uprights 1 apart to form upright frames, may be of box or channel section. The beam 2 illustrated is composed of two lipped channels interlocked to form a box section. An angle-section vertical bracket 7 is welded to each end of the beam 2. The front flange 8 of each bracket is formed with a plurality, four as shown in FIGURE 1, of hook members 9 for joining the beam 2 to the upright 1 by co-operation with holes 5 in the latter.

As may be seen from FIGURES 3 to 5, each hook member 9 is of hollow nose-like shape and is integral with the flange 8, from the material of which it is produced by blanking and forming. The blanking of each hook member 9 is arranged to leave a hole 10 of substantially square shape in the face of the flange 8 substantially opposite to the lower part of the said member. A narrower substantially rectangular hole 11 is also formed in the flange 8 above the root end of one or more hook members, for example above alternate members as shown in FIGURE 1.

The locking device 12 comprises an elongated strip of spring steel (FIGURES 2–5) fixed near its upper end to the flange 8 of the bracket 7 and provided, towards its other end, with rearwardly extending wing portions 13 which, in the operative position (FIGURE 4), project through the hole 11, above a hook member 9, in the flange 8 into a hole 5 in the face 6 of the upright 1 to effect the required locking. For fixing the device, the strip has a simple stamped-out tongue 14 which is engaged around the straight lower edge 10a, remote from the root part of the next higher hook member 9, of the hole 10 associated with that member, so as to grip the flange 8. If preferred, the flat end of the strip may be bent over to form such a tongue. The bent portion 15, instead of being straight (FIGURE 3), may be rounded shape where it engages the straight edge 10a, so as to facilitate the slight rocking movement hereinafter referred to. If desired, a pivotal rivet connection could alternatively be employed.

Beyond an intermediate tapering portion 16, which may be bent back slightly as shown in FIGURE 4, the wing portions 13 are bent rearwardly with inwardly inclined parts 17 (FIGURE 2), or rounded parts, and then parallel to each other to form wings 18 extending through the hole 11 in the flange 8. If desired, the material of the wings 18 may be folded on itself to strengthen these parts. Beyond the wing portions 13, the strip has a neck 19 followed by a portion with flanges 20, which are either directed rearwardly and inwardly as shown or are shaped to a substantially cylindrical form. This portion, which forms a finger piece, can be received in the hole 10 below that with which the tongue 14 is engaged, as shown in FIGURE 4. If desired, the extremity of the strip may be of flat form to facilitate manipulation. At the end edge adjacent to the tongue 14, two rearwardly directed dimples 21 are formed. As will be apparent from FIGURE 3, the dimples 21 center the strip by engagement with the side edges of the hole 10 in which the tongue 14 is engaged.

The mode of use of the locking device 12 is as follows:

The beam 2 is presented to the uprights 1 and the hook members 9 are entered into the holes 5 in the latter. In this operation, the wing portions 13 of the locking devices are pressed back by contact with the faces 6 of the uprights 1. The hook members 9 are then firmly engaged with the holes 5 by a short downward movement of the beam 2. At the end of this movement, the wing portions 13 of each device snap into the upper part of the hole 5 in the upright 1 not occupied by the adjacent hook member 9, as shown in FIGURE 4, thus blocking that member against upward movement and locking the beam 2 as a whole against the vertical movement by which alone it could be released from the uprights 1.

To release the locking action, each device 12, gripped by its free end, is flexed outwardly, and rocked slightly to one side, as shown in broken lines in FIGURE 3, so that one of its wing portions rests by its wing 18 upon the face 6 of the upright 1 beside one side edge 5a of the hole 5 in the upright, as shown in FIGURES 3 and 5. The adjacent hook member 9 is no longer obstructed by the wings 18 and the beam 2 can be slid upwardly and all the hook members 9 withdrawn. On removal of the beam 2, the said one wing 18 no longer rests on the face 6 of the upright 1 so that the device snaps back, due to the springiness of the strip, towards its initial position. During this movement, the inclined part 17 of the one wing portion 18 will slide on the adjacent edge 11a of the hole 11, so that the locking device as a whole will be rocked automatically to its initial middle position shown in FIGURE 1. Alternatively, contact between a rounded or inclined part, such as 20, of the free end of the device with a side portion of the inside of the hook member 9 or a side edge of the hole 10 could be arranged to effect or assist in such return of the device.

As will be understood, the locking devices 12 at the two ends of a beam 2 can be set separately in the released position (FIGURES 3 and 5) and will then remain in that position until the beam is removed. Consequently, the removal of a beam 12 can be simply performed by a single operator, as can also its mounting and automatic locking in position. The shape of the hook members 9 assists both engagement in and disengagement from the holes 5.

Generally, a plurality of hook members 9 will be provided in a vertical line, as shown in FIGURE 1, or in two or three lines. However, locking devices 12 may be employed in conjunction with single such members. The locking devices and hook members need not be on a flange or other face part of a component. They may be provided on an end thereof. They may be used, for instance, for mounting a cantilever component on a support. In this case, two opposite directed hook members may be arranged, in conjunction with a locking device, so that they can be brought into tight engagement with corresponding holes by a relative turning movement of the component after the said members have been entered into the holes. For some connection purposes, the locking devices 12 and the hook members 9 may be provided in an inverted position on the supporting component and the holes 5 in the supported component.

I claim:

1. In combination with connection means comprising at least one hook provided upon a first component and engageable in a hole in a second component, a locking device comprising a spring strip having a mounting portion by which the device is pivotably fixed to the said first component so as to be rockable transversely thereof and a wing portion projection from the strip and engageable through a hole in the first component in a hole in the second component for locking the said components together.

2. A device as claimed in claim 1, wherein the hole in the first component is a hole produced in the said component in the formation of a hook member from the material of that component.

3. A device as claimed in claim 1, wherein the said hole (11) in the first component is wider than the said hole (5); opposite to the wing portion (13), in the second component, whereby the said wing portion can be lodged to rest upon the face of the second component beside one side edge of the said hole therein by rocking the strip transversely after disengaging the said wing portion from the last-named hole.

4. A device as claimed in claim 1, wherein the spring strip has a finger piece normally received in a hole (10) in the said first component at a hook member (9).

5. A locking device for use in conjunction with connection means comprising at least one hook member provided upon a first component and engageable in a hole in a second component, which device is arranged to cooperate with the first component by way of at least one hole provided in the said first component where a hook member is located, a spring strip formed with a wing portion projecting from the strip for effecting locking engagement in a hole in the said second component and, near the end remote from the said wing portion, with a tongue engageable over an edge of said hole in the said first component for the purpose of fixing the device thereto in such a manner as to permit not only rocking of the strip away from the said first component, but also rocking movement of the strip transversely of that component.

6. A locking device for use in conjunction with connection means comprising at least one hook member provided upon a first component and engageable in a hole in a second component, which device is arranged to cooperate with the first component by way of at least one hole provided in the said first component where a hook member is located, a spring strip formed with a wing portion projecting from the strip for effecting locking engagement in a hole in the said second component and, near the end remote from the said wing portion, with a tongue engageable over an edge of said hole in the said first component for the purpose of fixing the device thereto in such a manner as to permit not only rocking of the strip away from the said first component, but also rocking movement of the strip transversely of that component, the said strip having, near the end remote from the wing portion, centering formations engageable with the side edges of the said hole, in the first component, with which the said tongue is engaged.

References Cited

UNITED STATES PATENTS

| | | | |
|---|---|---|---|
| 2,895,619 | 7/1959 | Frazier | 287—189.36 X |
| 3,047,108 | 7/1962 | D'Altrui | 287—189.36 |
| 3,095,975 | 7/1963 | Cassel et al. | 211—148 |
| 3,273,720 | 9/1966 | Seiz | 211—148 |
| 3,352,584 | 11/1967 | Engel | 287—189.36 |

CARL W. TOMLIN, Primary Examiner

WAYNE L. SHEDD, Assistant Examiner

U.S. Cl. X.R.

108—110; 211—148